(12) United States Patent
Morioka et al.

(10) Patent No.: US 7,251,922 B2
(45) Date of Patent: Aug. 7, 2007

(54) TIRE REINFORCING STEEL CORD AND TIRE

(75) Inventors: Noritaka Morioka, Hyogo (JP); Sinya Harikae, Kanagawa (JP)

(73) Assignees: Tokusen Kogyo Co., Ltd., Hyogo (JP); The Yokohama Rubber Co., Ltd., Tokyo (JP)

( * ) Notice: Subject to any disclaimer, the term of this patent is extended or adjusted under 35 U.S.C. 154(b) by 793 days.

(21) Appl. No.: 10/333,498

(22) PCT Filed: Mar. 28, 2002

(86) PCT No.: PCT/JP02/03090

§ 371 (c)(1), (2), (4) Date: Jan. 21, 2003

(87) PCT Pub. No.: WO02/079567

PCT Pub. Date: Oct. 10, 2002

(65) Prior Publication Data

US 2004/0250936 A1 Dec. 16, 2004

(30) Foreign Application Priority Data

Mar. 30, 2001 (JP) .............................. 2001-099429

(51) Int. Cl.
*D02G 3/48* (2006.01)
(52) U.S. Cl. .......................................... 57/236; 57/311
(58) Field of Classification Search ................. 57/236, 57/246, 248, 311
See application file for complete search history.

(56) References Cited

U.S. PATENT DOCUMENTS

| | | | |
|---|---|---|---|
| 5,287,691 A * | 2/1994 | Okamoto et al. ............. 57/236 |
| 5,707,467 A | 1/1998 | Matsumaru et al. | |
| 6,065,518 A | 5/2000 | Miyawaki et al. | |
| 6,446,423 B1 * | 9/2002 | Noferi ........................ 57/58.52 |
| 2002/0038538 A1 * | 4/2002 | Noferi ........................ 57/58.49 |
| 2003/0116248 A1 * | 6/2003 | Miyazaki et al. ........... 152/451 |
| 2003/0221762 A1 * | 12/2003 | Miyazaki et al. ........... 152/527 |
| 2005/0115218 A1 * | 6/2005 | Noferi ........................... 57/311 |
| 2006/0065341 A1 * | 3/2006 | Sarashi ...................... 152/451 |

FOREIGN PATENT DOCUMENTS

| | | |
|---|---|---|
| DE | 2842296 | 4/1979 |
| EP | 0 335 588 A2 | 10/1989 |
| EP | 0 604 228 A1 | 6/1994 |
| JP | 60-110496 | 7/1985 |

(Continued)

*Primary Examiner*—Shaun R. Hurley
(74) *Attorney, Agent, or Firm*—Carrier, Blackman & Associates, P.C.; Joseph P. Carrier; William D. Blackman

(57) ABSTRACT

A zero degree tire reinforcing steel cord is formed by twisting together four to seven individual wires having a wire diameter of 0.20 to 0.45 mm, wherein the steel cord has a substantially spiral or a substantially planar wavy deformation, has an elongation of 1.2% to 2.0% under a tensile load of 50 N and becomes substantially linear with its wavy deformation disappearing under a tensile load of 50 to 250 N. The steel cord stretches to a moderate extent so as to track expansion of the tire in the radial direction during the vulcanization process and thereafter restrains expansion of the tire in the radial direction during continued high speed rotation of the tire.

10 Claims, 4 Drawing Sheets

FOREIGN PATENT DOCUMENTS

| | | |
|---|---|---|
| JP | 64-006187 | 1/1989 |
| JP | 02-141309 | 5/1990 |
| JP | 03-208703 | 9/1991 |
| JP | 10-044713 | 2/1998 |
| JP | 11-198605 | 7/1999 |
| WO | WO 97/12091 | 4/1997 |

\* cited by examiner

TIRE REINFORCING STEEL CORD AND TIRE

FIELD OF THE INVENTION

The present invention relates to a tire reinforcing steel cord that is used as a reinforcing material for automobile tires and, in particular, heavy duty tires for trucks, buses, etc., as well as to tires employing same.

PRIOR ART

Reinforcing of tires employs the so-called tire cords that are formed by twisting together a plurality of fine filaments made of a material such as steel or an industrial fiber, for example nylon, polyester or aramid fiber.

Sections that are reinforced by the tire cords include a carcass section in which carcass reinforcing cords (carcass cords) 30 are aligned radially from the center of the tire circle so as to support a side wall as shown in FIG. 3, and a belt section in which belt reinforcing cords (belt cords) 20 are arranged in the form of "hoops" of a tub in the circumferential direction of the tire. In general, in the case of tires for passenger vehicles, the belt section employs steel cords and the carcass section employs industrial fiber cords, and in the case of heavy duty tires for trucks and buses, both the carcass section and the belt section employ steel cords.

It should be noted here that in addition to reinforcement of the belt section and the carcass section, as shown in FIG. 4, a tire has been developed in which a tire reinforcing cord A is wound a plurality of times along the direction of rotation of the tire in the vicinity of opposite side edges of the belt section. This tire reinforcing cord A is called a zero degree belt cord since, unlike a cord such as the belt reinforcing cord (belt cord) 20 or the carcass reinforcing cord (carcass cord) 30, which are disposed at an angle relative to the direction of rotation of the tire, it is wound along the direction of rotation of the tire, and it is arranged so as to restrain expansion of the tire in the radial direction due to heat generated by friction between the tire and the road surface while traveling or due to centrifugal force caused by high speed rotation of the tire. The tire reinforcing cord A employs an industrial fiber cord.

In recent years, as a result of the prevalence of expressways and accompanying increases in long distance truck transport and long distance buses, the time spent by trucks and buses traveling at high speed has rapidly increased and, moreover, the amount of heat generated by frictional resistance between the tires and the road surface and the degree of centrifugal force imposed on the tires have increased as a result of the high rotational speed of the tires accompanying high speed travel, and the forces expanding the tires in the radial direction have increased.

However, since the industrial fibers currently in use have low strength, they cannot resist the expansion force.

In order to solve this problem, the use of steel cord as the zero degree belt cord in place of the industrial fiber cord has been considered. Since the steel cord has far higher strength than the industrial fiber cord, expansion of the tire at high rotational speed can be restrained. However, the steel cord has the defect of poor stretch, and this causes a serious problem in tire production. That is, when producing tires, molding at high temperature and high pressure (the so-called vulcanization process) is carried out, and during this process the tire expands in the radial direction. In the case of the steel cords, they are arranged in the belt section and the carcass section in a state in which their ends are severed so that opposite ends are free. In the case of the industrial fiber cords, they have some degree of stretch. Therefore, such steel cords and fiber cords can track the expansion of the tire during molding. However, if a steel cord in which the cord itself has low stretch is used as the zero degree belt cord, since this steel cord is wound multiple times along the direction of rotation of the tire without being severed, it cannot track the expansion of the tire in the radial direction. Therefore, after vulcanization molding, the tire is molded in a state in which the zero degree belt cord 40, which is supposed to stay at the position S shown in FIG. 5A, sinks inside the tire as shown in FIG. 5B. This causes deformation of the tire, and at the same time the effect of restraining expansion of the tire during high speed rotation, which is the original object, cannot be expected.

DISCLOSURE OF THE INVENTION

The present invention has been carried out in view of the above circumstances, and the object thereof is to provide a steel cord that is embedded in a tire as a zero degree belt cord for heavy duty tires for trucks, buses, etc., that has a moderate degree of stretch so as to allow it to track the expansion of the tire in the radial direction during the vulcanization process in the molding of the tire, and that has less stretch after the molding of the tire, thereby restraining the expansion of the tire in the radial direction due to continuous high speed rotation of the tire. According to a present embodiment of the invention, a reinforcing steel cord as shown at 1, 10 in FIGS. 1A-2B may be used as a zero degree belt cord such as cord A shown in FIG. 4.

In order to accomplish the above object, in accordance with the present invention, there is proposed a steel cord having a 1×n structure formed by twisting together four to seven individual wires having a wire diameter of 0.20 to 0.45 mm, the steel cord being wound a plurality of times in the vicinity of opposite side edges of a belt section of a tire, wherein the steel cord has a substantially spiral or a substantially planar wavy deformation, has an elongation of 1.2% to 2.0% when applying a tensile load of 50 N in a tensile test according to JIS (Japanese Industrial Standard) B 7721, and becomes substantially linear with the wavy deformation thereof disappearing under a tensile load in the range of 50 to 250 N.

Since the steel cord itself of the present invention has a wavy deformation, it has excellent stretch under low load and stretches in response to expansion of the tire during the vulcanization process; after the vulcanization process (after completion of molding of the tire), since the wavy deformation of the steel cord substantially disappears and the steel cord becomes substantially linear, it is possible to restrain expansion of the tire due to heat generation or centrifugal force caused during high speed rotation of the tire.

The limits to the values in the above arrangement arise for the following reasons.

That is, the reason that the diameter of individual wires of the steel cord is set in a range of 0.20 to 0.45 mm is because, when it is less than 0.20 mm, sufficient strength cannot be obtained and it is necessary to increase the number of individual wires in order to obtain a required cord strength thus increasing the cost, and when it is more than 0.45 mm, the rigidity becomes too high, thus degrading tire performance.

Furthermore, the reason that the structure is limited to the 1×n structure with single layer twisting is because it is possible to employ single twisting and the production cost can be kept down compared with an n+m structure with double twisting. The number of individual wires that are possible in single layer twisting is limited to 4 to 7.

Moreover, the reason that the elongation with a tensile load of 50 N in the tensile test according to JIS B 7721 is set in a range of 1.2% to 2.0% is because, when the elongation is less than 1.2%, it is too small for the cord to cope with the expansion during vulcanization and, as a result the cord cannot be retained at a desired position in the vicinity of the belt section and, when the elongation exceeds 2.0%, it is too large and the wavy deformation remains after molding the tire, and the effect of restraining expansion of the tire during high speed rotation cannot be exhibited.

Furthermore, the reason that the tensile load at which the wavy deformation disappears and the cord becomes substantially linear is set in a range of 50 to 250N is because, when it is less than 50 N, the wavy deformation given to the cord is stretched out in the course of the vulcanization process (in the course of tire expansion), the cord therefore cannot be retained at a desired position, and the tire might deform. When it exceeds 250 N, since the wavy deformation remains in the cord after the vulcanization process, it is impossible to restrain expansion of the tire during high speed rotation.

It should be noted here that the state of 'the wavy deformation disappearing and the cord becoming substantially linear' in the arrangement of the present invention can be recognized visually, but it can also be determined from a load-elongation graph in the tensile test. An evaluation method by the tensile test is explained below by reference to FIG. 6.

The cord load-elongation graph is usually obtained according to JIS B 7721 with a tensile load as the ordinate and the elongation as the abscissa by fixing opposite ends of the cord so that they do not rotate in the tensile tester, then gradually applying tension to the cord, and recording the progress up to break. As means for measurement of the elongation here there is a self-registering recorder attached to the tensile tester, or making a mark at a predetermined distance on the cord and reading off the amount of movement of the mark, and the self-registering recorder is employed below.

FIG. 6 shows an example of the load-elongation graph of a steel cord having a wavy deformation recorded by the self-registering recorder.

The relationship between the load and the elongation of the steel cord having a wavy deformation in the tensile test has, as shown in FIG. 6, a quadratic curve (A) having a gentle slope in the low load region and becomes a straight line (B) showing proportionality between the load and the elongation as the load increases, and as the load further increases, the steel cord reaches the yield point and then breaks.

The quadratic curve having a gentle slope exhibited above in the low load region is due to the steel cord tightening up and the wavy deformation being stretched into a straight line.

That is, although the steel cord has a dense structure (closed type), when there is no tensile load imposed thereon, the individual wires are not in full contact with each other. When a tensile load is applied to the steel cord, the individual wires tighten up so as to be in full contact with each other, and as a result the steel cord elongates. Furthermore, since there is a wavy deformation, the wavy deformation stretches to become a straight line. Since these effects can occur with a small load, they collectively result in the quadratic curve (A) having a gentle slope in the low load region.

Subsequently, as the load increases, the steel cord tightens up, the wavy deformation disappears, the steel cord becomes linear, and the load-elongation graph becomes straight line (B).

Therefore, the load at which the cord becomes substantially linear is the load at the inflection point H where, in the small elongation region, the quadratic curve (A) having gentle slope changes into the straight line (B).

The direction of the substantially spiral wavy deformation in the above arrangement is preferably opposite to the twisting direction. This is due to the following reason.

That is, the steel cord having the above arrangement is the so-called closed type steel cord in which adjacent individual wires are loosely tightened together. When giving a wavy deformation to this steel cord, if it is carried out by turning it in a direction opposite to the twisting together direction, it is possible to form gaps between the individual wires of the steel cord for rubber to enter since the steel cord is turned so as to loosen the twisting. Furthermore, it should be noted that the 'substantially spiral' referred to in the arrangement of the present invention includes an oval shape and a track shape as well as a circular shape.

In the steel cord of the present invention, specifying the wavy deformation applied thereto can introduce a moderate degree of stretch, the steel cord stretches so as to increase the diameter of the cord ring while tracking the expansion of the tire during the vulcanization process in the molding of the tire, and it is therefore possible to retain the cord ring at a desired position in the vicinity of the belt section. Moreover, after the vulcanization, the wavy deformation of the steel cord is fully stretched out so as to be substantially linear, the steel cord becomes integral with rubber, and its high strength can restrain expansion of the tire during high speed rotation.

BEST MODE FOR CARRYING OUT THE INVENTION

Embodiments of the present invention are explained below by reference to the drawings.

Figure 1A:
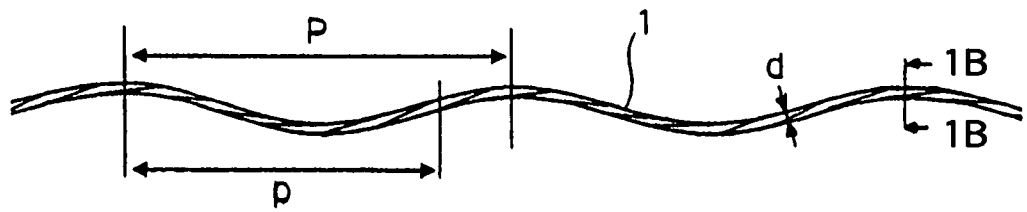
FIG. 1A is a schematic plan view of a cord showing a first embodiment of the present invention.
Figure 1B:
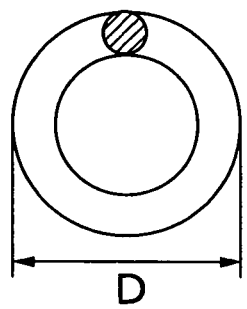
FIG. 1B is a cross section along line 1B-1B in FIG. 1A.

FIGS. 1A and 1B are a schematic plan view and a cross section of a cord showing the first embodiment of the present invention. A steel cord 1 shown in FIGS. 1A and 1B has a 1×n structure formed by twisting together four to seven individual wires having a wire diameter of 0.20 to 0.45 mm; the steel cord 1 itself has a substantially spiral wavy deformation (wavy deformation pitch P, twist pitch p, and apparent external diameter D of the cord); when a tensile load of 50 N is applied to the steel cord 1 in a tensile test according to JIS B 7721, the elongation is 1.2% to 2.0%; and the tensile load that makes the wavy deformation disappear and the steel cord 1 substantially linear is in the range of 50 to 250 N.

Figure 2A:
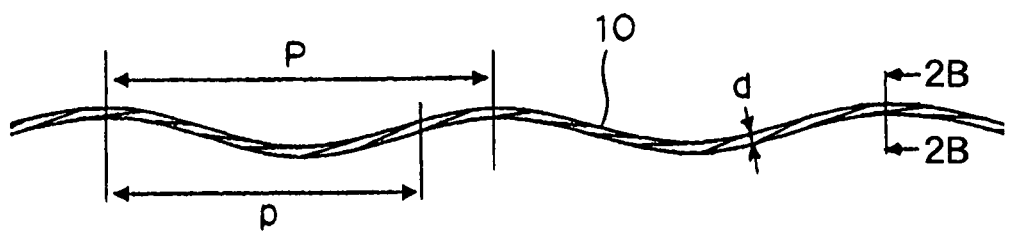
FIG. 2A is a schematic plan view of a cord showing a second embodiment of the present invention.
Figure 2B:
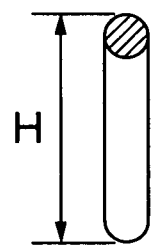
FIG. 2B is a cross section along line 2B-2B in FIG. 2A.
Figure 3:
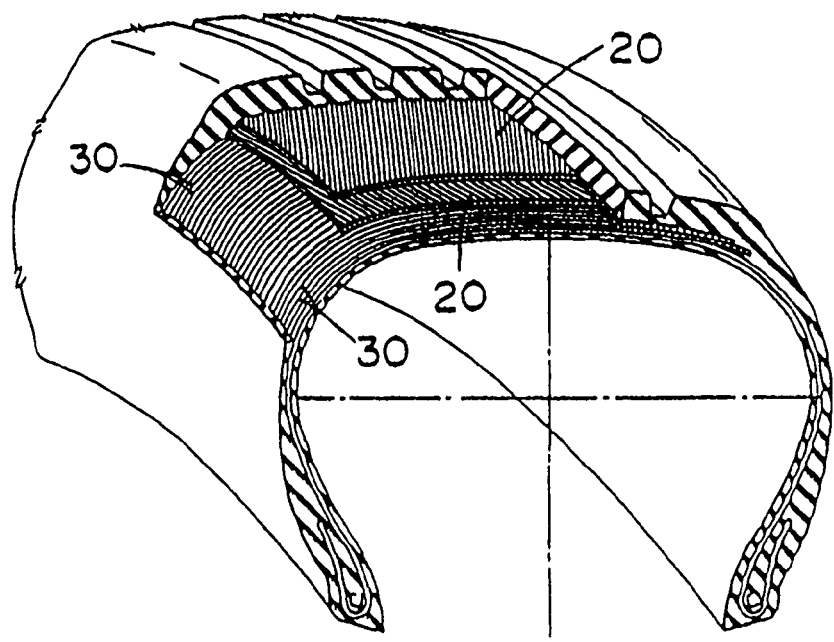
FIG. 3 is a schematic sectional perspective view showing a conventional tire structure.
Figure 4:
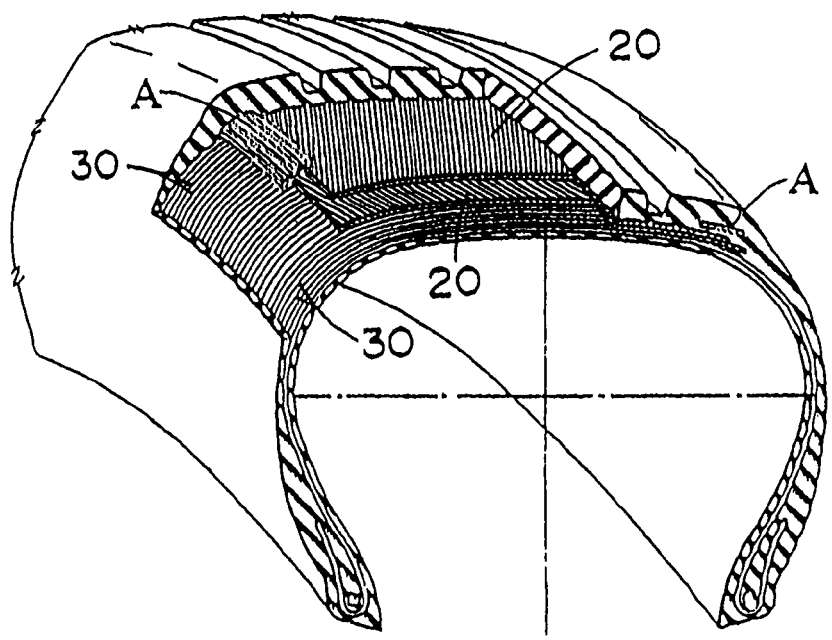
FIG. 4 is a schematic sectional perspective view showing another conventional tire structure in which the vicinity of a belt section is reinforced with industrial fiber.
Figure 5A:
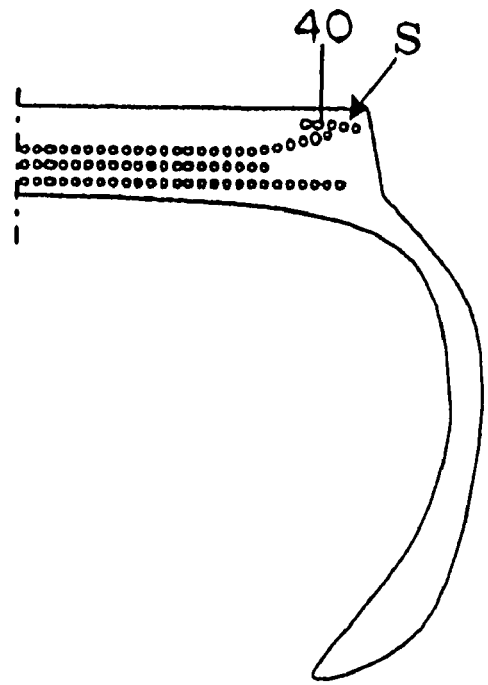
FIG. 5A is a schematic cross section of a tire at the place where a zero degree belt cord is positioned.
Figure 5B:
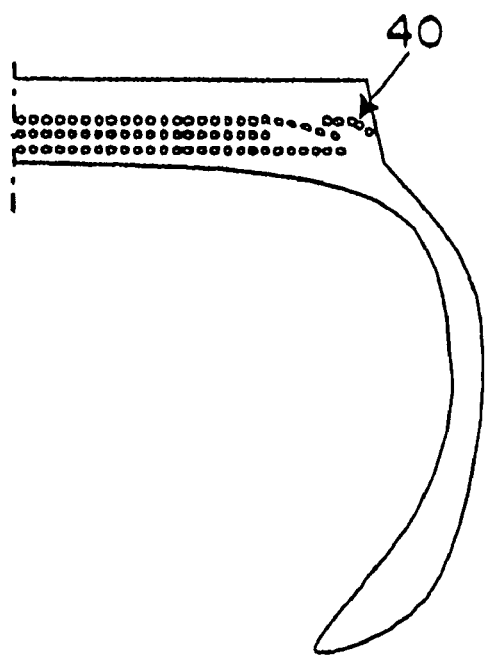
FIG. 5B is a schematic cross section of a tire showing a state in which a zero degree belt cord has sunk inside the belt cord of the tire.
Figure 6:
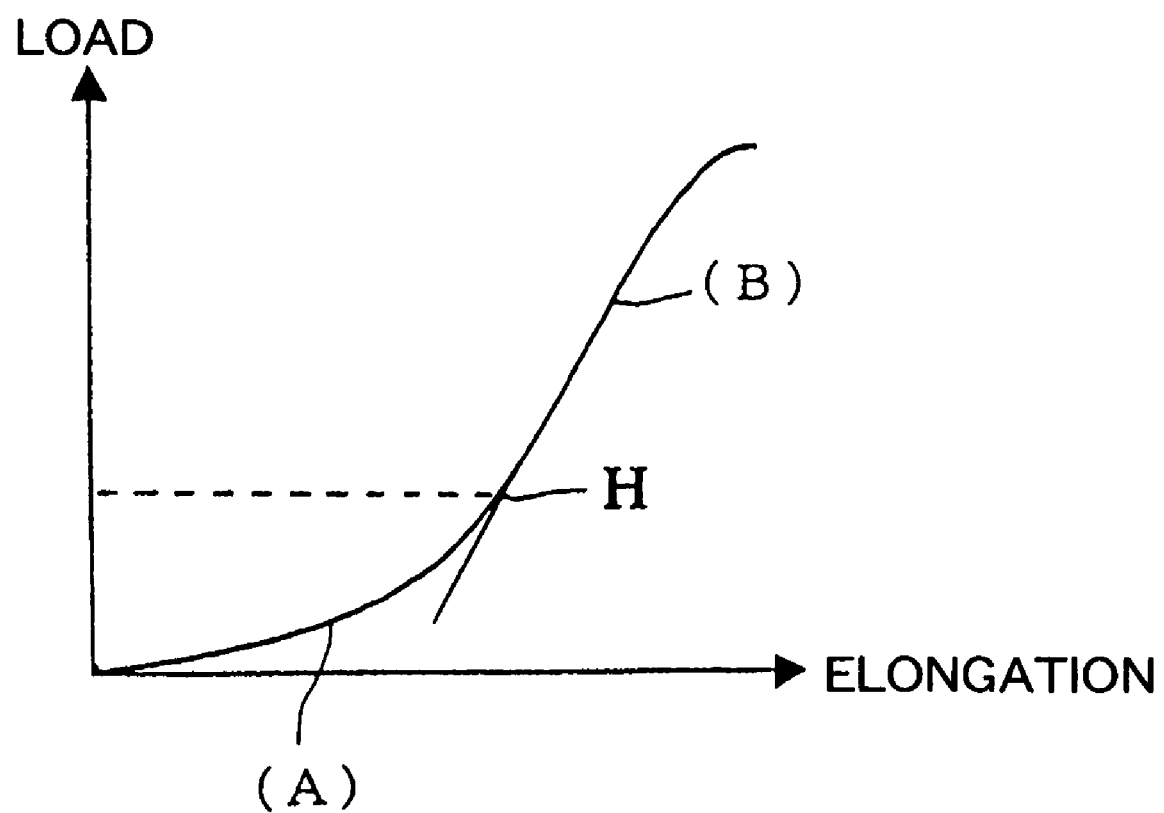
FIG. 6 is a graph showing a load-elongation characteristic of a steel cord having a wavy deformation.

FIGS. 2A and 2B show the second embodiment of the present invention; the wavy deformation is in a substantially planar shape (two-dimensional wave) having a wave height H and, as in the first embodiment above, a steel cord 10 in this embodiment has an elongation of 1.2% to 2.0% when a tensile load of 50 N is applied thereto, and the tensile load that makes the wavy deformation disappear and the steel cord 10 substantially linear is in the range of 50 to 250 N.

The wave height H in FIG. 2B denotes the amplitude of the two-dimensional wave.

A specific example of the steel cord of the present invention is now explained.

A wire having a diameter of 5.5 mm whose steel type corresponded to SWRS 82A in JIS was subjected repeatedly to patenting and wiredrawing, a brass plating was applied to its surface, the wire was then subjected to wiredrawing to give a wire diameter of 0.20 to 0.45 mm, and four to seven of these wires were twisted together and then processed so as to have a substantially spiral wavy deformation, thus producing a steel cord having a wavy deformation.

With regard to means for introducing a substantially spiral wavy deformation into the cord, there is a method for introducing a deformation using a deformation-introducing device that rotates with a supplied steel cord as an axial core.

With regard to means of introducing a substantially planar wavy deformation, there is a method in which, after the spiral wavy deformation is introduced as above, it is pressed with a roller, etc. or a method in which it is crimped by gear wheels, etc.

The steel cord of the present invention was produced by passing the steel cord through three pins provided on the deformation-introducing device rotating at high speed. The apparent external diameter and the pitch were adjusted by selecting various combinations of the diameter and the gap of the deformation-introducing pins, the degree pushed in, the tension of the cord, and the rotational speed of the deformation-introducing device.

Since the steel cord of the present invention has the arrangement above, it has a moderate degree of stretch and strength, it stretches so as to increase the diameter of the cord ring while tracking the expansion of the tire during the vulcanization process in the molding of the tire, and it is therefore possible to retain the cord ring at a desired position in the vicinity of the belt section. Moreover, since the tire has less stretch after it has been molded, it is possible to restrain expansion of the tire in the radial direction during continued high speed rotation of the tire.

INDUSTRIAL APPLICABILITY

When the steel cord of the present invention is applied to a heavy duty tire for a truck or a bus, the shape retention of the tire can be enhanced and the lifespan can be increased outstandingly.

What is claimed is:

1. A tire reinforcing steel cord having a 1×n structure formed by twisting together four to seven individual wires having a wire diameter of 0.20 to 0.45 mm, the steel cord being wound a plurality of times in the vicinity of opposite side edges of a belt section of a tire, wherein the steel cord has a substantially spiral or a substantially planar wavy deformation, has an elongation of 1.2% to 2.0% when applying a tensile load of 50 N in a tensile test according to JIS B 7721, and becomes substantially linear with the wavy deformation thereof disappearing under a tensile load in the range of 50 to 250 N.

2. The tire reinforcing steel cord according to claim 1 wherein the direction of the substantially spiral wavy deformation is opposite to the twisting direction.

3. A tire employing the tire reinforcing steel cord according to either claim 1 or claim 2.

4. The tire according to claim 3 wherein the tire reinforcing steel cord is a zero degree belt cord.

5. The tire according to claim 3 wherein the reinforcing steel cord is continuously wound multiple times in a circumferential direction of the tire in the vicinity of opposite side edges of a belt section of the tire.

6. The tire according to claim 3 wherein the wavy deformation of the steel cord substantially disappears and the steel cord becomes substantially linear when the tire is vulcanized.

7. The tire reinforcing steel cord according to claim 1 wherein the 1×n structure has a single layer twisting.

8. A tire reinforced with steel cord formed by the following process:
   forming a reinforcing steel cord having a 1×n structure formed by twisting together four to seven individual wires having a wire diameter of 0.20 to 0.45 mm such that the steel cord has a substantially spiral or a substantially planar wavy deformation and an elongation of 1.2% to 2.0% when applying a tensile load of 50 N in a tensile test according to JIS B 7721;
   continuously winding the steel cord multiple times in a circumferential direction of a tire in the vicinity of opposite side edges of a belt section of a tire; and
   vulcanizing the tire such that the wavy deformation of the steel cord substantially disappears and the steel cord becomes substantially linear.

9. The tire reinforced with steel cord according to claim 8 wherein a direction of the substantially spiral wavy deformation is opposite to the twisting direction.

10. The tire reinforced with steel cord according to claim 8 wherein the tire reinforcing steel cord is a zero degree belt cord.

* * * * *

UNITED STATES PATENT AND TRADEMARK OFFICE
CERTIFICATE OF CORRECTION

PATENT NO. : 7,251,922 B2
APPLICATION NO. : 10/333498
DATED : August 7, 2007
INVENTOR(S) : Morioka et al.

It is certified that error appears in the above-identified patent and that said Letters Patent is hereby corrected as shown below:

Column 1:
    Line 8, change "heavy duty tires" to --heavy-duty tires--.
    Line 26, change "heavy duty tires" to --heavy-duty tires--.
    Line 42, change "high speed rotation" to --high-speed rotation--.
    Line 45, change "long distance truck" to --long-distance truck--.
    Line 46, change "long distance buses" to --long-distance buses--.
    Line 52, change "high speed travel" to --high-speed travel--.

Column 2:
    Line 14, change "high speed rotation" to --high-speed rotation--.
    Line 22, change "heavy duty tires" to --heavy-duty tires--.
    Line 28, change "high speed rotation" to --high-speed rotation--.
    Line 53, change "high speed rotation" to --high-speed rotation--.
    Line 66, change "single layer twisting" to --single-layer twisting--.

Column 3:
    Line 3, change "single layer twisting" to --single-layer twisting--.
    Line 8, change "and, as a result the" to --and, as a result, the--.
    Line 13, change "high speed rotation" to --high-speed rotation--.
    Line 20, change "the cord therefore" to --the cord, therefore,--.
    Lines 24-25, change "high speed rotation." to --high-speed rotation.--.
    Line 51, change "low load region" to --low-load region--.
    Line 57, change "low load region" to --low-load region--.

Column 4:
    Lines 2-3, change "low load region." to --low-load region.--.
    Line 10, change "small elongation region, the quadratic curve (A) having" to --small-elongation region, the quadratic curve (A), having--.
    Line 11, change "gentle slope changes" to --gentle slope, changes--.
    Line 31, change "it is therefore possible" to --it is, therefore, possible--.
    Line 36, change "high speed rotation." to --high-speed rotation.--.

Column 5:
    Line 38, change "a roller, etc. or" to --a roller, etc., or--.
    Line 50, change "strength, it stretches" to --strength. It stretches--.
    Line 52, change "and it is" to --and it is,--.
    Line 53, change "therefore possible" to --therefore, possible--.
    Line 57, change "high speed rotation" to --high-speed rotation--.

UNITED STATES PATENT AND TRADEMARK OFFICE
CERTIFICATE OF CORRECTION

PATENT NO. : 7,251,922 B2
APPLICATION NO. : 10/333498
DATED : August 7, 2007
INVENTOR(S) : Morioka et al.

It is certified that error appears in the above-identified patent and that said Letters Patent is hereby corrected as shown below:

Column 6:
 Line 4, change "heavy duty tire" to --heavy-duty tire--.
 Line 35, change "single layer twisting." to --single-layer twisting.--.

Signed and Sealed this

Fourth Day of March, 2008

JON W. DUDAS
*Director of the United States Patent and Trademark Office*